United States Patent [19]

Emkey et al.

[11] Patent Number: 4,701,011
[45] Date of Patent: Oct. 20, 1987

[54] MULTIMODE FIBER-LENS OPTICAL COUPLER

[75] Inventors: William L. Emkey, Bethlehem-Hanover Township, Northampton County; Curtis A. Jack, Kutztown-Maxatawny Township, Berks County, both of Pa.

[73] Assignee: American Telephone and Telegraph Company, AT&T Bell Laboratories, Murray Hill, N.J.

[21] Appl. No.: 691,677

[22] Filed: Jan. 15, 1985

[51] Int. Cl.$^4$ .............................................. G02B 6/32
[52] U.S. Cl. ............................ 350/96.18; 350/96.16; 350/96.31
[58] Field of Search ............... 350/96.15, 96.16, 96.18, 350/96.20, 96.21, 96.29, 96.30, 96.31, 96.25

[56] References Cited

U.S. PATENT DOCUMENTS

| | | | |
|---|---|---|---|
| 3,829,195 | 8/1974 | Rawson | 350/96.18 |
| 3,874,779 | 4/1975 | Thiel | 350/96.16 |
| 4,078,852 | 3/1978 | Lebduska | 350/96.18 |
| 4,119,362 | 10/1978 | Holzman | 350/96.18 |
| 4,185,885 | 1/1980 | Chown et al. | 350/96.18 |
| 4,193,663 | 3/1980 | Timmermann | 350/96.18 |
| 4,201,447 | 5/1980 | Thompson et al. | 350/96.31 |
| 4,229,067 | 10/1980 | Love | 350/96.15 |
| 4,268,112 | 5/1981 | Peterson | 350/96.18 |
| 4,304,461 | 12/1981 | Stewart et al. | 350/96.18 |
| 4,327,963 | 5/1982 | Khoe et al. | 350/96.18 |
| 4,475,789 | 10/1984 | Kahn | 350/96.15 |

OTHER PUBLICATIONS

"Coupling Characteristics Between Single Mode Fiber . . . ", *IEEE Trans. Micro. Theory and Tech.*, vol. MTT-30, No. 6, Jun. 1982, Kishimoto et al., pp. 882-893.

"Experimental Investigation of Beam Spot Size . . . ", Electron. Lett., vol. 20, No. 15, Jul. 1984, Keil et al., pp. 621-622.

*Primary Examiner*—John Lee
*Attorney, Agent, or Firm*—Wendy W. Koba

[57] ABSTRACT

A novel expanded beam coupling arrangement for use in association with single mode fibers is disclosed. An appropriate length of multimode fiber is fused to the endface of an input single mode fiber, where the length of the multimode fiber is chosen to provide the desired lensing conditions of the input beam. The multimode fiber is thus used as a lens, but provides many advantages over prior art optical connectors which use conventional quarter-pitch GRIN lenses epoxied to the fiber endfaces. In particular, the misalignment associated with the epoxied arrangement is reduced since the multimode fiber-lens connector of the present invention may be chosen to comprise the same outer diameter as the single mode fiber. Additionally, the use of a section of optical fiber as a lens allows for a fused connection to be used instead of an epoxied connection, which results in a more stable and rugged interface between the fiber and the lens.

16 Claims, 8 Drawing Figures

MULTIMODE FIBER-LENS OPTICAL COUPLER

BACKGROUND OF THE INVENTION

1. Field of the Invention

The present invention relates to a coupler for use in association with single mode fibers and, more particularly, to such a coupler which comprises an appropriate length of multimode fiber connected to the end of the single mode fiber wherein the section of multimode fiber performs as a lens.

2. Description of the Prior Art

A common problem in the design of single mode optical components is the need to provide efficient and stable optical coupling. Typically, this coupling is between two single mode optical fibers located at different ports on a given device. A standard method of coupling two single mode fibers requires the expansion of the input beam passing through an input single mode fiber using a lens, often a graded-index (GRIN) lens. The expanded beam then passes through the optical component(s) after which a second lens focuses the beam onto the core of the output single mode fiber. One such arrangements disclosed in U.S. Pat. No. 4,193,663 issued to C. Timmermann on Mar. 18, 1980. In this arrangement, a lens is adhered to the end of the fiber, where the lens is made of a material having a melting point which is low in relation to the melting point of the fiber, resulting in a light guide having an essentially semispherical lens at the end. In one embodiment, the lens is made of epoxy in order to facilitate the adhesion to the fiber. The use of a GRIN lens as a coupling mechanism between two fibers is disclosed in U.S. Pat. No. 4,268,112 issued to K. P. Peterson on May 19, 1981. Several different embodiments are disclosed which are based on the optical transmission characteristics of a Luneberg lens. In particular, a spherical "bead" of graded-index material is used, where the bead is formed around a wire, for example, tungsten, in order to leave a precision hole through the center of the bead. Input and output fibers are then inserted at opposite ends of this hole, where the ends of the fibers are positioned at the focal points of the spherical bead. Both of these arrangements require that the axes of the lenses intersect the center of the fiber core and that the lenses themselves be situated in the plane of the fiber junction. An alternative prior art arrangement which substantially mitigates these difficulties is disclosed in U.S. Pat. No. 4,327,963 issued to G. D. Khoe et al on May 4, 1982. In this arrangement a convex spherical graded index lens is used which is rotationally symmetric about any axis through its center. Therefore, alignment between the fiber and the lens is somewhat simplified, yet the center of the lens must still be aligned with the core of the fiber.

A problem remaining with these and other prior art coupling designs is the sensitivity to misalignment at the fiber/lens interface. This misalignment creates both the need for precise micropositioning during fabrication and the need to maintain a stable fiber/lens bond while the device is in use.

SUMMARY OF THE INVENTION

The problem remaining in the prior art has been solved in accordance with the present invention which relates to a coupler for use in association with single mode fibers and, more particularly, to a coupler which comprises an appropriate length of multimode fiber connected to the end of a single mode fiber, wherein the section of multimode fiber performs as a lens.

It is an aspect of the present invention to provide a coupling arrangement which is smaller, less expensive, and more rugged than prior art arrangements while providing the same advantages associated with prior art expanded beam coupling arrangements.

Another aspect of the present invention is to overcome the above-described misalignment problem by utilizing an arrangement wherein the single mode transmission fiber and multimode fiber-lens comprise essentially the same outer diameter and are connected using a fusion technique. Therefore, when the fibers are joined, the surface tension during the fusion process will automatically align the fibers.

Yet another aspect of the present invention is to provide a stable, rugged interface between the communcation fiber and the lens. Since the multimode fiber-lens may be directly fused to the single mode transmission fiber, the bond between them is significantly stronger and more stable than that of prior art arrangements which required that a conventional lens be epoxied to the end of the single mode fiber.

A further aspect of the present invention is to provide a coupler which is relatively smaller in dimension than prior art couplers for use in association with large arrays of single mode fibers arranged in close proximity to each other, for example, as a ribbon connector. Additionally, the discussed advantage of reduced misalignment sensitivity is most useful in the fiber array situation.

Other and further aspects of the present invention will become apparent during the course of the following discussion and by reference to the accompanying drawings.

BRIEF DESCRIPTION OF THE DRAWINGS

Referring now to the drawings, where like numerals represent like parts in several views

DETAILED DESCRIPTION

Figure 1:
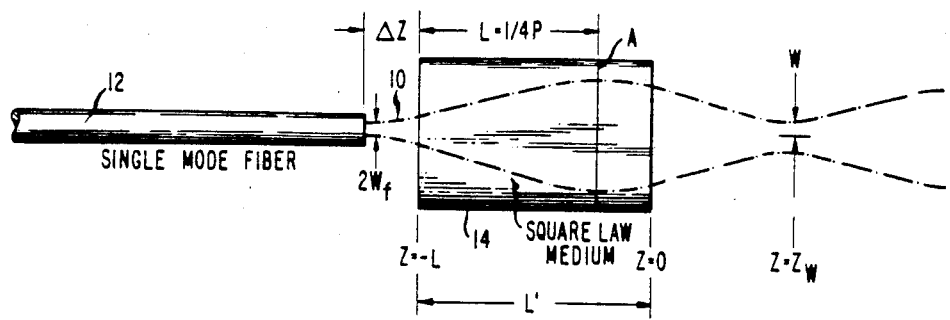
FIG. 1 illustrates the propagation of a Gaussian beam from a single mode fiber and through a square law medium.

As stated above, the present invention provides an optical coupler which utilizes a section of multimode fiber as a lens which can be directly fused onto the end of the transmission fiber. In practicing the present invention, any type of multimode fiber may be utilized, two examples being a step-index multimode fiber and a graded-index multimode fiber. As is well-known in the art, "step-index" refers to a fiber which comprises a core region having a refractive index $n_o$ and a cladding region having a refractive index $n_1$, where $n_o > n_1$ and a definite "step" exists between the indices of these two regions. A graded-index fiber, on the other hand, is defined as a fiber with an index of refraction that is a function of the various glasses used to form the concentric layers of core and cladding in the fiber, thus providing a more gradual change in refractive index than the step-index fiber. One particular form of graded-index fiber, which may be used in association with the present invention, can be defined as a square law medium, where the radial dependence of the refractive index in a square law medium can be represented by $$n(r) = n_o[1 - g^2 r^2]^{\frac{1}{2}} \quad (1)$$

where $n_o$ is defined as the refractive index on the optical axis and g is the focusing parameter given by $$g = \sqrt{2\Delta}/a \quad (2)$$

where $\Delta$ is the relative index difference between $n_o$ and the fiber cladding and a is the core radius. FIG. 1 illustrates a Gaussian beam 10 exiting a single mode fiber 12 and passing through a square law medium 14. The waist position and beam size associated with Gaussian beam 10 may be found from equations well-known in the art and fully described in the article "Coupling Characteristics between Single-Mode Fibers and Square Law Medium" by R. Kishimoto et al appearing in *IEEE Tran. Microwave Theory Tech.*, Vol. MTT-30, No. 6, June 1982 at pp. 882–93. In order to achieve the maximum expansion at Z=0 of input beam 10 as it passes through square law medium 14 (which is desirable in many cases to provide maximum coupling efficiency), square law medium 14 should comprise a length L equal to $\pi/2$ g, where g is the focusing parameter defined in equation (2). This is commonly referred to in the art as a quarter-pitch square law device. It is to be understood that this discussion of a square law embodiment is exemplary only, and for the purposes of explanation, not limitation, since a fiber-lens formed in accordance with the present invention may utilize any gradient which is capable of achieving focusing. In general, the present invention relates to using any type of multimode fiber of an appropriate length as a lens which can be directly fused to the end of single mode fiber 12 to provide efficient and stable optical coupling of the single mode fiber to other fibers or optical components in the system.

In order to provide the advantages of "single fiber" uniformity with a minimum of misalignment between the communication fiber and the fiber-lens, it is desirable, although not necessary, to utilize a multimode fiber-lens which comprises the same outer diameter as the single mode communication fiber. The surface tension of the molten glass tends to self-align the multimode fiberlens to the single mode fiber, thus facilitating the alignment.

Figure 2:
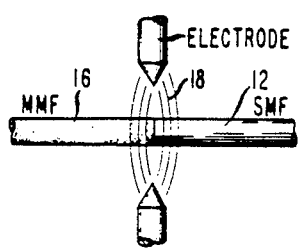
FIGS. 2–4 illustrate the individual steps of an exemplary method used to form a graded-index multimode fiber-lens in accordance with the present invention.
Figure 3:
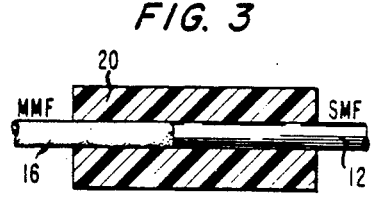
Figure 4:
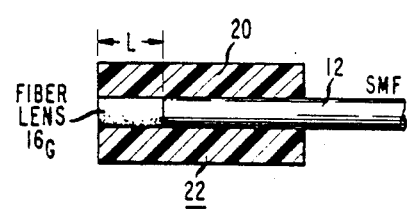

It is to be understood that a coupler formed in accordance with the present invention may utilize any method of connecting the multimode fiber-lens to the single mode transmission fiber. For example, a UV curing cement may be used to secure the fiber-lens to the endface of the single mode fiber. Alternatively, the fiber-lens may be epoxied to the endface of the single mode transmission fiber. However, an advantage of the present invention is that the coupling lens is formed from a section of optical fiber, thus allowing the lens to be directly fused to the endface of the single mode fiber. As stated above, the utilization of a fusion joining process provides a coupling arrangement which is more rugged and less susceptible to subsequent misalignment problems. FIGS. 2–4 illustrate the steps involved in an exemplary fusion process used in the formation of a coupling arrangement of the present invention which utilizes a section of graded-index multimode fiber to form the fiber-lens. The first step in the formation process is to fuse the endface of single mode fiber 12 to the endface of a graded-index multimode fiber 16. This is accomplished, as shown in FIG. 2, by placing the ends of fibers 12 and 16 in a heat source 18, for example, an electric arc, which will rsult in forming a low loss fusion region between single mode fiber 12 and graded-index multimode fiber 16. As stated above, the maximum expansion of an input beam will occur if graded-index multimode fiber-lens 16 comprises a quarter pitch length. Therefore, the next step in the process of forming an exemplary coupler of the present invention is to reduce multimode fiber 16 to the above-defined quarter pitch length. The reduction in the length of multimode fiber 16 may simply be accomplished by scribing and breaking fiber 16 at the desired location. However, this method is difficult to control and may not provide reproducible results. In an alternative method, fused fibers 12 and 16 may be placed in a housing to provide additional structural support and subsequently polished to the desired length. As shown in FIG. 3, a capillary tube 20 may be used as such a housing, where fused fibers 12 and 16 are waxed or epoxied in place. FIG. 4 illustrates a fiber-lens coupler 22 which have been polished to achieve the desired quarter pitch length. It is to be noted that subsequent to the final polishing, housing 20 may be removed, where such removal may be necessary when the size of the coupler is required to be as small as possible. The above-described ribbon connector arrangement is one example. Alternatively, housing 20 may be left intact to provide a degree of additional stability and ruggedness. As will be discussed in greater detail hereinafter, there exist many instances when the fiber-lens of the present invention should comprise a length greater than the quarter pitch length. In that case, the arrangement is made to the appropriate longer length. Alternatively, a fiber-lens of less than quarter pitch length may be required, most notably when an epoxy or other material is used to join the single mode fiber to the fiber-lens since the presence of this additional material adds to the effective overall length of the fiber-lens coupler.

Figure 5:
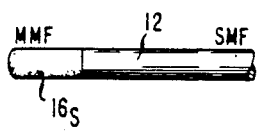
FIG. 5 illustrates a step-index multimode fiber-lens formed in accordance with the present invention.

An alternative coupling arrangement of the present invention, as stated above, utilizes an appropriate length $L_s$ of a step-index multimode fiber fused to an endface of the single mode transmission fiber. FIG. 5 illustrates a fiber-lens of the present invention formed using a section of step-index multimode fiber $16_s$. Similar to the above-described arrangement, the length $L_s$ of step-index multimode fiber-lens $16_s$ is chosen to provide a beam width capable of achieving sufficient optical coupling. As is known in the art, the radius of the core of a step-index fiber influences the beam width, where a relatively large core region is desirable for the purposes of the present invention. In the formation of a step-index fiber-lens, the multimode fiber-lens is first fused to the endface of the single mode transmission fiber, as shown in FIG. 2. The fiber-lens is then polished or cleaved to the appropriate length $L_s$, where the end portion of fiber-lens $16_s$ is placed in a heat source to obtain a rounded profile, as shown in FIG. 5. The rounded endface of fiber-lens $16_s$ will function to collimate the beam passing through rather than allowing the beam to continue to expand indefinitely. It is to be noted that a fiber-lens formed from a section of graded-index multimode fiber, as previously discussed, may also comprise a rounded endface, where this structure may be useful in situations requiring extreme focusing of a wide angle beam.

Figure 6:
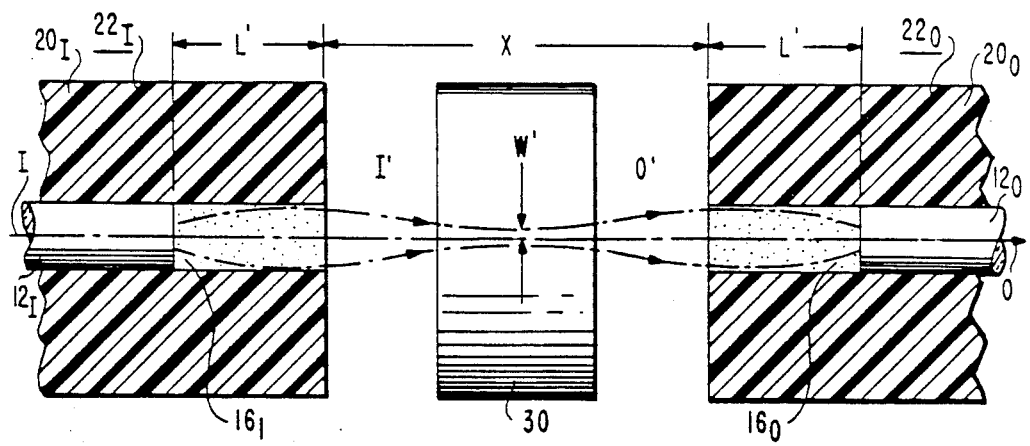
FIG. 6 illustrates an exemplary system using multimode fiber-lenses formed in accordance with the present invention.

As briefly mentioned above, the quarter pitch fiber-lens, useful when two single mode fibers are to be butt-coupled or maintained in relatively close proximity, may not provide sufficient coupling between fibers which are significantly displaced. It is often necessary to separate input and output fibers by a considerable distance, which for fiber-lenses may only be the range of a few millimeters. In this case, a quarter-pitch graded-index fiber-lens would not be desirable since the collimation of the beam exiting the fiber-lens is not perfect, i.e., the beam width will continue to expand, resulting in poorer coupling to the output fiber. For large separations, optimum coupling occurs when using fiber-lenses which are longer than quarter pitch length. FIG. 6 illustrates such a arrangement, where each fiberlens 16 comprises a length $L'$ greater than the determined quarter pitch length.

Referring to FIG. 6, a guided input light beam I passes through single mode input fiber $12_I$ and enters coupler $22_I$ which comprises a multimode fiber-lens $16_I$ fused to the end of input single mode fiber $12_I$ by the process described above. As previously discussed, fiberlens $16_I$ may be formed from a section of graded-index multimode fiber and comprise a length $L'$ which is greater than the quarter pitch length L. (Alternatively, a stepindex fiber may be utilized which exhibits partial beam convergence). Therefore, the output beam $I'$ from coupler $22_I$ converges to a waist $W'$, as shown in FIG. 6. Convergent beam $I'$ subsequently passes a distance X through optical component 30, which may in fact comprise a number of optical components. The detailed structure of optical component(s) 30 is not pertinent to the practice of the present invention. After passing through optical component(s) 30, the light beam, now referred to as divergent output beam $O'$, enters output coupler $22_O$, as shown in FIG. 6. Output coupler $22_O$ comprises the same length $L'$ as input coupler $22_I$ (for a symmetric arrangement, but in general may comprise any desired length) and is configured to perform the inverse operation of input coupler $22_I$. Here, divergent beam $O'$ passes through multimode fiber-lens $16_O$ where it is refocussed and coupled to output single mode fiber $12_O$. As shown in FIG. 6, fiber $12_O$ is fused to the end of multimode fiberlens $16_O$ in the same manner described above in association with FIGS. 2–4.

Figure 7:
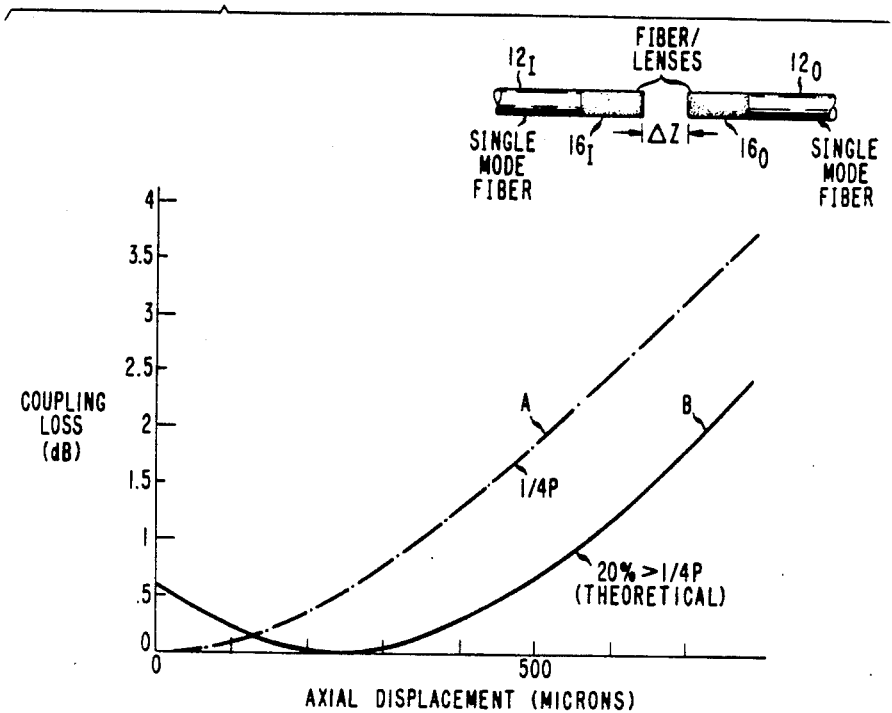
FIG. 7 contains a graph illustrating the axial dependency of coupling loss for both an exemplary quarter pitch length graded-index multimode fiber-lens coupling arrangement and an exemplary greater than quarter pitch length graded-index multimode fiber-lens coupling arrangement of the present invention.

To further explain the relationship between fiber-lens length and coupling efficiency, FIG. 7 illustrates coupling loss (in dB) as a function of axial displacement for two exemplary coupling arrangements utilizing fiber-lenses formed in accordance with the present invention. The first arrangement utilizes a pair of quarter pitch length (251 μm) graded-index fiber-lenses (in particular, AT&T 62.5/125 μm fiber), where the loss associated with this arrangement is illustrated by curve A. The second arrangement utilizes a pair of graded-index fiber-lenses, each fiber-lens comprising a length (300 μm) greater than the quarter pitch length. As expected, the quarter pitch length fiber-lens arrangement experiences minimum loss, 0 db, when the fibers are butt-coupled (i.e., axial displcement equals zero). Curve B indicates that this exemplary extended length fiber-lens arrangement will exhibit a 0 dB coupling loss when the input and output fibers are separated by approximately 250 μm. As seen by reference to FIG. 7, a 2 dB loss is experienced by the quarter pitch length fiber-lens arrangement when the fibers are displaced by 500 μm, where the extended length fiber-lens arrangement may be displaced by an additional 200 μm, to a distance of approximately 700 μm, before a 2 dB coupling loss is observed. It is to be noted that if the extended-length fiber-lens is used in a butt-coupled arrangement, it will exhibit a loss of approximately 0.5 dB, which is greater than 0.0 dB quarter-pitch length fiber-lens arrangement.

Figure 8:
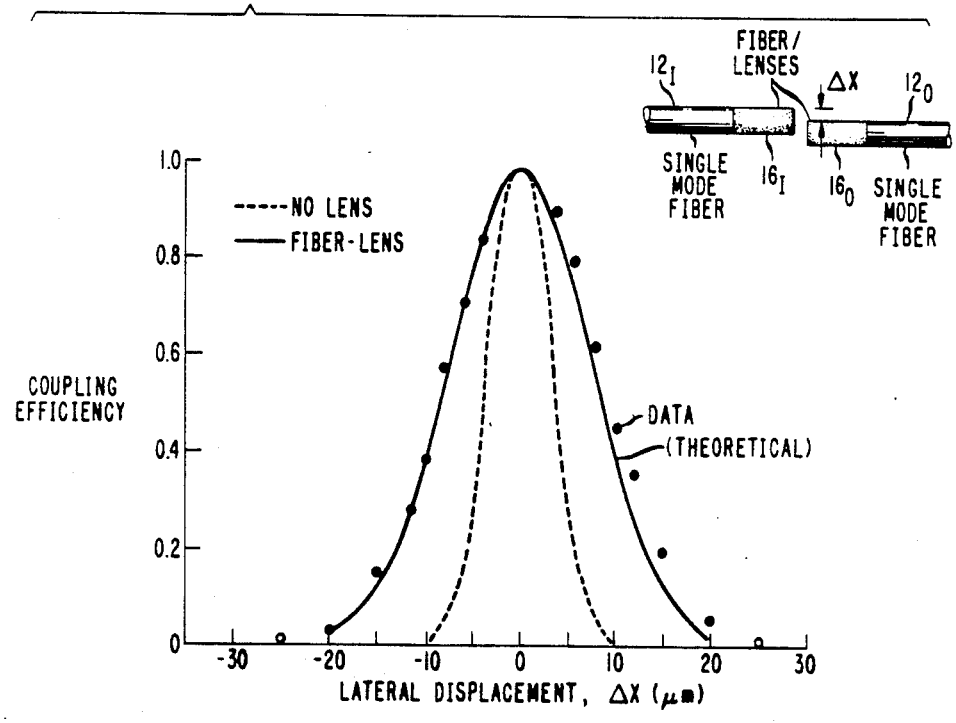
FIG. 8 contains a graph illustrating the coupling efficiency as a function of lateral misalignment for exemplary unlensed single mode fibers and single mode fibers using the graded-index multimode fiber-lens coupler of the present invention.

Fiber-lens formed in accordance with the present invention may also be evaluated for lateral misalignment tolerances. The results of these measurements are given in FIG. 8. Also shown in FIG. 8 are calculations of lateral misalingment tolerances for unlensed fibers, using the equations referred to above in association with the Kishimoto article. Referring to FIG. 8, a 5 μm lateral displacement between conventional unlensed single mode fibers results in a reduction in coupling efficiency from 100% for zero displacement to approximately 30%. This is a serious reduction, since a 5 μm tolerance is often used in the industry as the maximum allowable tolerance. Using an exemplary graded-index multimode fiber-lens arrangement of the present invention provides a coupling efficiency of approximately 80%, well within industry specifications for this 5 μm tolerance. In fact, as seen by reference to FIG. 8, a lateral displacement of 10 μm between the single mode fibers will not completely disrupt transmission when the exemplary fiber-lens arrangement of the present invention is used, since a coupling efficiency of over 40% exists for this misalignment. However, when no lensing arrangement is used, transmission is essentially lost between two fibers which are displaced by 10 μm. It is to be noted that with selective choice of multimode fiber parameters, both the axial and longitudinal misalignment tolerances can be increased considerably.

In addition to using the fused fiber-lens of the present invention in the above-described one-to-one coupling arrangement, the present invention is applicable to situations using fiber array coupling arrangements. Fiber arrays are often arranged in what is referred to as a "ribbon" configuration, i.e., a 1×N array. Connecting two ribons together is an extremely difficult task which, by the nature of the proximity of the fibers to each other, demands almost perfect alignment. Utilizing the fused fiber-lens coupling arrangement of the present invention is seen to overcome this alignment problem since, as described above, the use of a fusion region between the single mode transmission fiber and the multimode fiber-lens overcomes the ahgnment problems associated with prior art coupling arrangements.

What is claimed is:

1. An arrangement for providing coupling of an optical signal between an input single mode fiber and an output single mode fiber, said arrangement comprising a separate section of multimode fiber of a predetermined length and comprising a first endface and a second endface, the first endface of said multimode fiber being fused to said input single mode fiber to provide coupling therebetween.

2. An arrangement as defined in claim 1 wherein the section of multimode fiber- comprises a predetermined length of step-index multimode fiber wherein the step-index multimode fiber second endface possesses a rounded profile.

3. An arrangement as defined in claim 2 wherein the section of graded-index multimode fiber- comprises a length L' different from the quarter pitch length.

4. An arrangement as defined in claim 3 wherein the length L' is greater than the quarter pitch length.

5. An arrangement as defined in claim 3 wherein the length L' is less than the quarter pitch length.

6. An arrangement as defined in claim 1 wherein the section of multimode fiber- comprises a predetermined length of graded-index multimode fiber.

7. An arrangement as defined in claim 6 wherein the graded-index multimode fiber second endface possesses a rounded profile.

8. An arrangement as defined in claim 6 wherein the section of graded-index multimode fiber- comprises a length L defined as the quarter pitch length.

9. An arrangement as defined in claim 1 wherein the outer diameter of the section of multimode fiber is substantially equal to the outer diameter of the input single mode fiber so as to facilitate alignment of said single mode fiber to said multimode fiber.

10. An optical arrangement comprising:

a single mode optical communication fiber capable of receiving an optical signal at a first endface for propagation therethrough to exit at a second, opposite endface; and a section of multimode optical fiber including a first endface and a second, opposing endface, the first endface being fused to the second endface of the single mode communication fiber to perform as a lens and collimate the optical signal passing therethrough and exiting the second endface.

11. An optical arrangement as defined in claim 10 wherein the outer diameter of the single mode optical communication fiber is substantially equal to the outer diameter of the section of multimode optical fiber.

12. An optical arrangement as defined in claim 10 wherein the second endface of the section of multimode optical fiber comprises a rounded profile.

13. An optical arrangement as defined in claim 10 wherein the section of multimode optical fiber comprises a length L defined as the quarter pitch length.

14. An optical arrangement as defined in claim 10 wherein the section of multimode optical fiber comprises a length L' different from the quarter pitch length.

15. An optical arrangement as defined in claim 14 wherein the length L' is greater than the quarter pitch length.

16. An optical arrangement as defined in claim 14 wherein the length L' is less than the quarter pitch length.

* * * * *